(12) United States Patent
Dzik (10) Patent No.: US 9,319,702 B2
(45) Date of Patent: Apr. 19, 2016

(54) DYNAMIC SLICE RESIZING WHILE ENCODING VIDEO

(71) Applicant: Intel Corporation, Santa Clara, CA (US)

(72) Inventor: Dariusz Dzik, Allentown, PA (US)

(73) Assignee: Intel Corporation, Santa Clara, CA (US)

( * ) Notice: Subject to any disclaimer, the term of this patent is extended or adjusted under 35 U.S.C. 154(b) by 485 days.

(21) Appl. No.: 13/692,118

(22) Filed: Dec. 3, 2012

(65) Prior Publication Data

US 2014/0153644 A1     Jun. 5, 2014

(51) Int. Cl.
*H04N 7/26* (2006.01)
*H04N 19/436* (2014.01)
*H04N 19/119* (2014.01)
*H04N 19/172* (2014.01)
*H04N 19/146* (2014.01)

(52) U.S. Cl.
CPC ........... *H04N 19/436* (2014.11); *H04N 19/119* (2014.11); *H04N 19/146* (2014.11); *H04N 19/172* (2014.11)

(58) Field of Classification Search
CPC ..... H04N 19/159; H04N 19/46; H04N 19/14; H04N 19/13
See application file for complete search history.

(56) References Cited

U.S. PATENT DOCUMENTS

| | | | | |
|---|---|---|---|---|
| 6,870,883 | B2 | 3/2005 | Iwata | 375/240.01 |
| 8,041,132 | B2 | 10/2011 | Yan | 382/232 |
| 2002/0094031 | A1* | 7/2002 | Ngai et al. | 375/240.27 |
| 2007/0009045 | A1* | 1/2007 | Mohandas | 375/240.25 |
| 2007/0086528 | A1 | 4/2007 | Mauchly et al. | 375/240.24 |
| 2009/0307464 | A1 | 12/2009 | Steinberg et al. | 712/31 |
| 2010/0158126 | A1* | 6/2010 | Bai et al. | 375/240.16 |
| 2010/0246665 | A1 | 9/2010 | Brederson et al. | 375/240.01 |
| 2010/0296575 | A1 | 11/2010 | Lee et al. | 375/240.02 |
| 2013/0003830 | A1* | 1/2013 | Misra et al. | 375/240.12 |

* cited by examiner

*Primary Examiner* — Jay Patel
*Assistant Examiner* — Neil Mikeska
(74) *Attorney, Agent, or Firm* — Green, Howard, & Mughal LLP (57) ABSTRACT

An apparatus having a plurality of processors is disclosed. The processors may be configured to (i) gather a plurality of statistics by encoding a current picture in a video signal, (ii) calculate a plurality of complexity values in response to both the statistics and a plurality of coefficients and (iii) partition a next picture in the video signal into a plurality of slices in response to the complexity values such that each of the slices has a similar coding complexity. The statistics generally characterize how the current picture was encoded. The coefficients may correspond to a plurality of coding modes.

16 Claims, 8 Drawing Sheets

DYNAMIC SLICE RESIZING WHILE ENCODING VIDEO

FIELD OF THE INVENTION

The present invention relates to video encoding generally and, more particularly, to a method and/or apparatus for implementing dynamic slice resizing while encoding video.

BACKGROUND OF THE INVENTION

An H.264 Advanced Video Coder (i.e., H.264) standard introduced a high compression efficiency coding technique. With multi-core systems and multi-core processors becoming more popular, parallelism is a well-suited solution to overcome high computational complexity associated with the H.264 standard. The H.264 standard provides spatial splitting of video frames into independent blocks, called slices, that are suitable for parallel processing.

Observations show that slice-level parallel encoding often does not achieve an expected performance. Due to variable computational complexity of the video material, static slice sizes are processed in uneven time intervals. Therefore, processor workload is not evenly distributed and computational power is not used efficiently for cores which finished the slice processing sooner than other cores.

Figure 1:
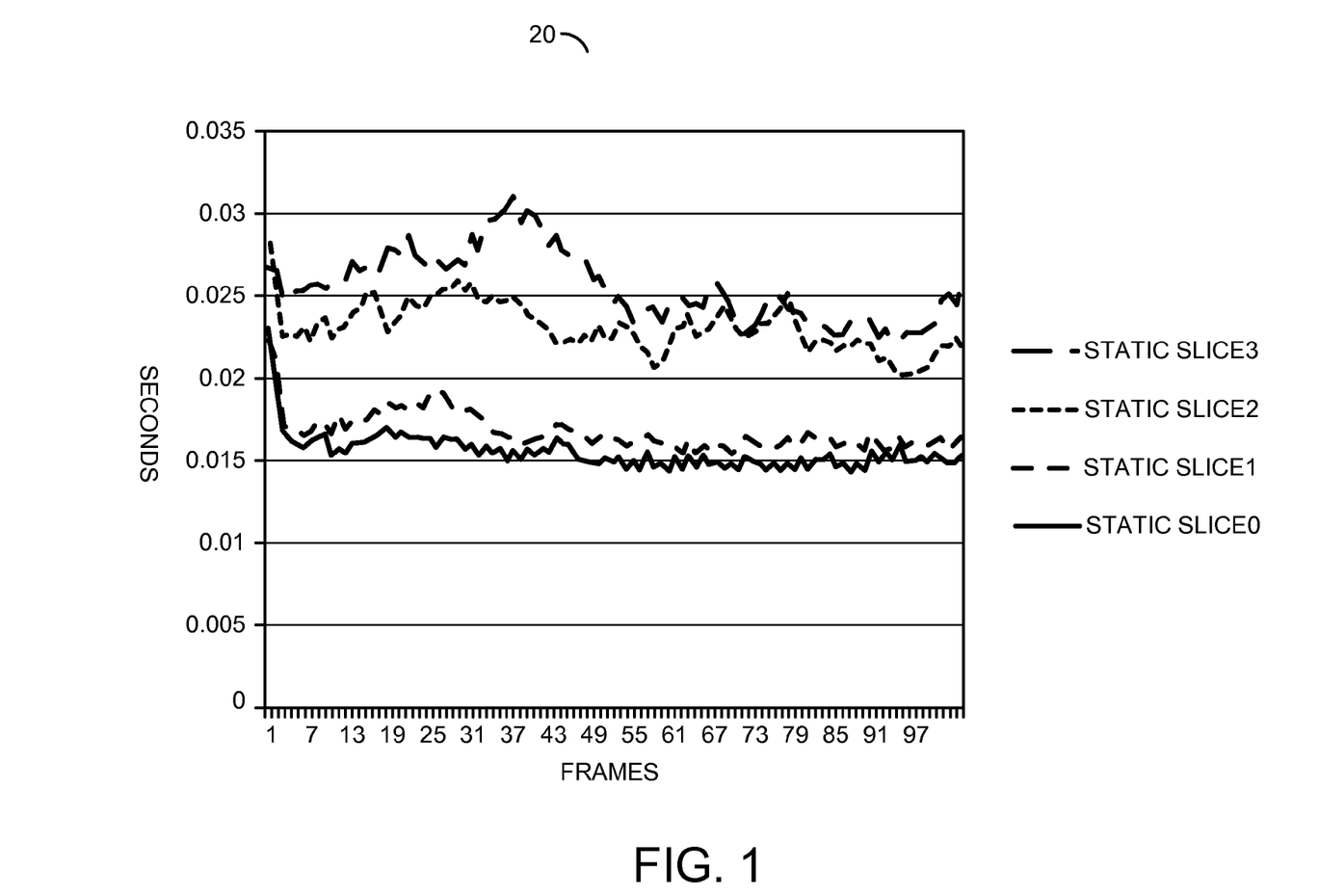
FIG. 1 is a graph of example conventional slice encoding time using static slice sizes.

Referring to FIG. 1, a graph 20 of example conventional slice encoding time using static slice sizes is shown. The graph 20 illustrates four similar-sized slices from a 1280×710 sequence of 100 frames using quantization parameters of 32 for intra-predicted frames and 30 for inter-predicted frames. As illustrated, Slice0 and Slice1 (bottom two curves) are consistently encoded in less time than Slice2 and Slice3 (top two curves).

It would be desirable to implement dynamic slice resizing while encoding video.

SUMMARY OF THE INVENTION

The present invention concerns an apparatus having a plurality of processors. The processors may be configured to (i) gather a plurality of statistics by encoding a current picture in a video signal, (ii) calculate a plurality of complexity values in response to both the statistics and a plurality of coefficients and (iii) partition a next picture in the video signal into a plurality of slices in response to the complexity values such that each of the slices has a similar coding complexity. The statistics generally characterize how the current picture was encoded. The coefficients may correspond to a plurality of coding modes.

The objects, features and advantages of the present invention include providing dynamic slice resizing while encoding video that may (i) gather statistics from a current picture encode, (ii) calculate complexity values in response to both the statistics and multiple coefficients, (iii) dynamically resize slices of a next picture based on the statistics and coefficients, (iv) distribute slice encoding tasks of similar complexity to multiple processor cores, (v) encode the slices in parallel and/or (vi) implement an H.264 codec.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Some embodiments of the present invention may provide a dynamic slice-resizing technique. The technique may improve a computational complexity balance and may increase encoding speed in a slice-level parallel encoder. The technique generally calculates computational complexity workloads from one or more previously coded pictures (or frames of fields or images) and dynamically changes the slice size for the following picture to balance the encoding workload among the processors.

Figure 2:
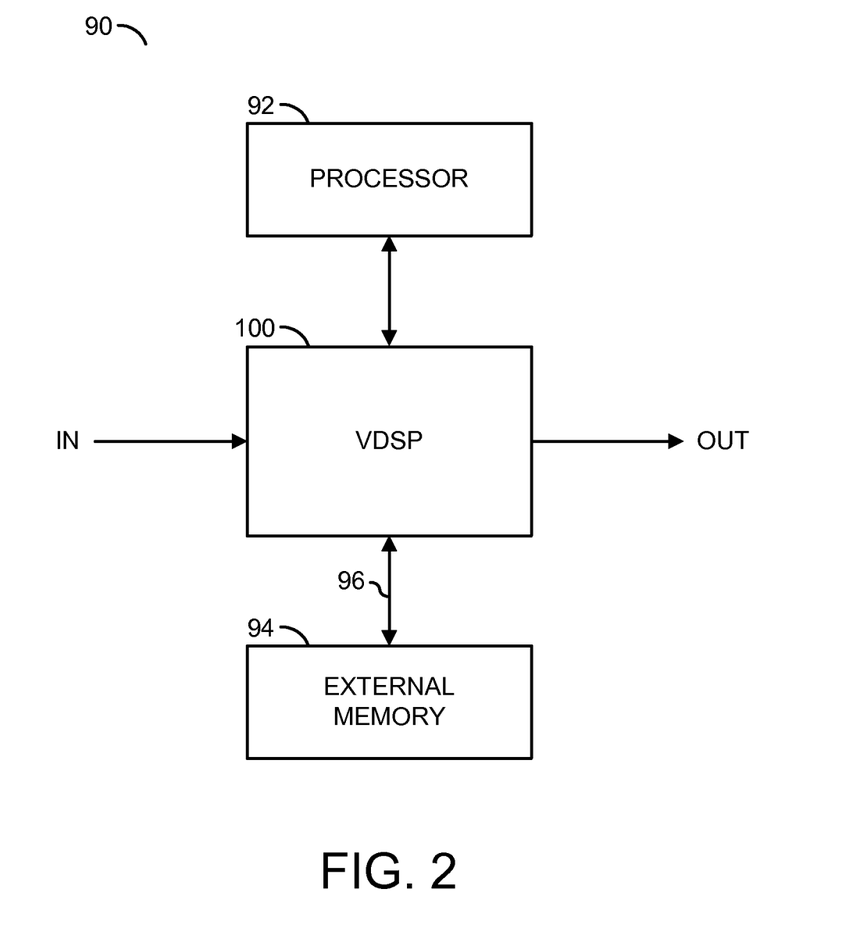
FIG. 2 is a block diagram of an example implementation of an apparatus.

Referring to FIG. 2, a block diagram of an example implementation of an apparatus 90 is shown. The apparatus (or circuit or device or integrated circuit) 90 may implement a video encoder. The apparatus 90 generally comprises a block (or circuit) 92, a block (or circuit) 94, a bus (or circuit) 96 and a block (or circuit) 100. The circuits 92-100 may represent modules and/or blocks that may be implemented as hardware, software, a combination of hardware and software, or other implementations.

The circuit 100 may be directly coupled with the circuit 92 to exchange data and control information. The circuit 100 may be coupled with the circuit 94 to exchange data. An input signal (e.g., IN) may be received by the circuit 100. An output bitstream signal (e.g., OUT) may be presented by the circuit 100.

The signal IN may be one or more analog video signals and/or one or more digital video signals. The signal IN generally comprises a sequence of progressive-format frames and/or interlace-format fields. The signal IN may include synchronization signals suitable for synchronizing the video information. The signal IN may be presented in analog form as, but not limited to, an RGB (Red, Green, Blue) signal, an EIA-770 (e.g., YCrCb) signal, an S-video signal and/or a Composite Video Baseband Signal (CVBS). In digital form, the signal IN may be presented as, but is not limited to, a High Definition Multimedia Interface (HDMI) signal, a Digital Video Interface (DVI) signal and/or a BT.656 signal. The signal IN may be formatted as a standard definition signal or a high definition signal.

The signal OUT may be a compressed and encoded digital video signal, generally referred to as a bitstream. The signal OUT may comprise a sequence of progressive-format frames and/or interlace-format fields. The signal OUT may be compliant with a VC-1, MPEG and/or H.26x standard. The MPEG/H.26x standards generally include H.263, H.264, MPEG-1 MPEG-2, MPEG-4 and H.264. The MPEG standards may be defined by the Moving Pictures Expert Group, International Organization for Standards, Geneva, Switzerland. The H.26x standards may be defined by the International Telecommunication Union-Telecommunication Standardization Sector, Geneva, Switzerland. The VC-1 standard may be defined by the document Society of Motion Picture and Television Engineer (SMPTE) 421M-2006, by the SMPTE, White Plains, N.Y.

The circuit 92 may be implemented as a processor. The circuit 92 may be operational to perform select digital video encoding operations. The encoding may be compatible with the VC-1, MPEG or H.26x standards. The circuit 92 may also be operational to control the circuit 100. In some embodiments, the circuit 92 may implement a SPARC processor. In other embodiments, the circuit 92 may implement an ARM processor. Other types of processors may be implemented to meet the criteria of a particular application. The circuit 92 may be fabricated as an integrated circuit in (on) a single chip (or die).

The circuit 94 may be implemented as a dynamic random access memory (e.g., DRAM). The circuit 94 may be operational to store or buffer large amounts of information consumed and generated by the encoding operations of the apparatus 90. As such, the circuit 94 may be referred to as a main (or external) memory. The circuit 94 may be implemented as a double data rate (e.g., DDR) memory. Other memory technologies may be implemented to meet the criteria of a particular application. The circuit 94 may be fabricated as an integrated circuit in (on) a single chip (or die). In some embodiments, the circuits 92 and 94 may be fabricated in (on) separate chips.

The circuit 96 may implement a memory bus. The bus 96 is generally operational to carry data, address and commands between the circuit 100 and the circuit 94. The bus 96 generally includes a data bus having a width of multiple bits (e.g., 128 bits).

The circuit 100 may be implemented as a video digital signal processor (e.g., VDSP) circuit. The circuit 100 may be operational to perform additional digital video encoding operations. The circuit 100 may be controlled by the circuit 92. The circuit 100 generally comprises multiple digital signal processors (or cores). Encoding operations performed by the circuit 100 may include, but are not limited to the following. While encoding a sequence of pictures received via the signal IN, the circuit 100 may gather multiple statistics by encoding a current picture. The statistics may characterize how the current picture was encoded. The circuit 100 may also calculate multiple complexity values in response to both the statistics and two or more coefficients. The coefficients generally correspond to the coding modes (e.g., intra-prediction of I-pictures and/or I-blocks and inter-prediction of P-pictures and/or P-blocks). A next (or temporally adjacent) picture in the signal IN may be partitioned into several slices in response to the complexity values. Each slice may subsequently be encoded in parallel by a respective processor. The partitioning of the slices may produce slices having a similar coding complexity. Therefore, similar time may be used by each processor to encode the respective slice. The circuit 100 may be fabricated as an integrated circuit in (on) a single chip (or die). In some embodiments, the circuits 92 and 100 may be fabricated in (on) the same chip. In other embodiments, the circuits 92 and 100 may be fabricated in (on) separate chips.

Figure 3:
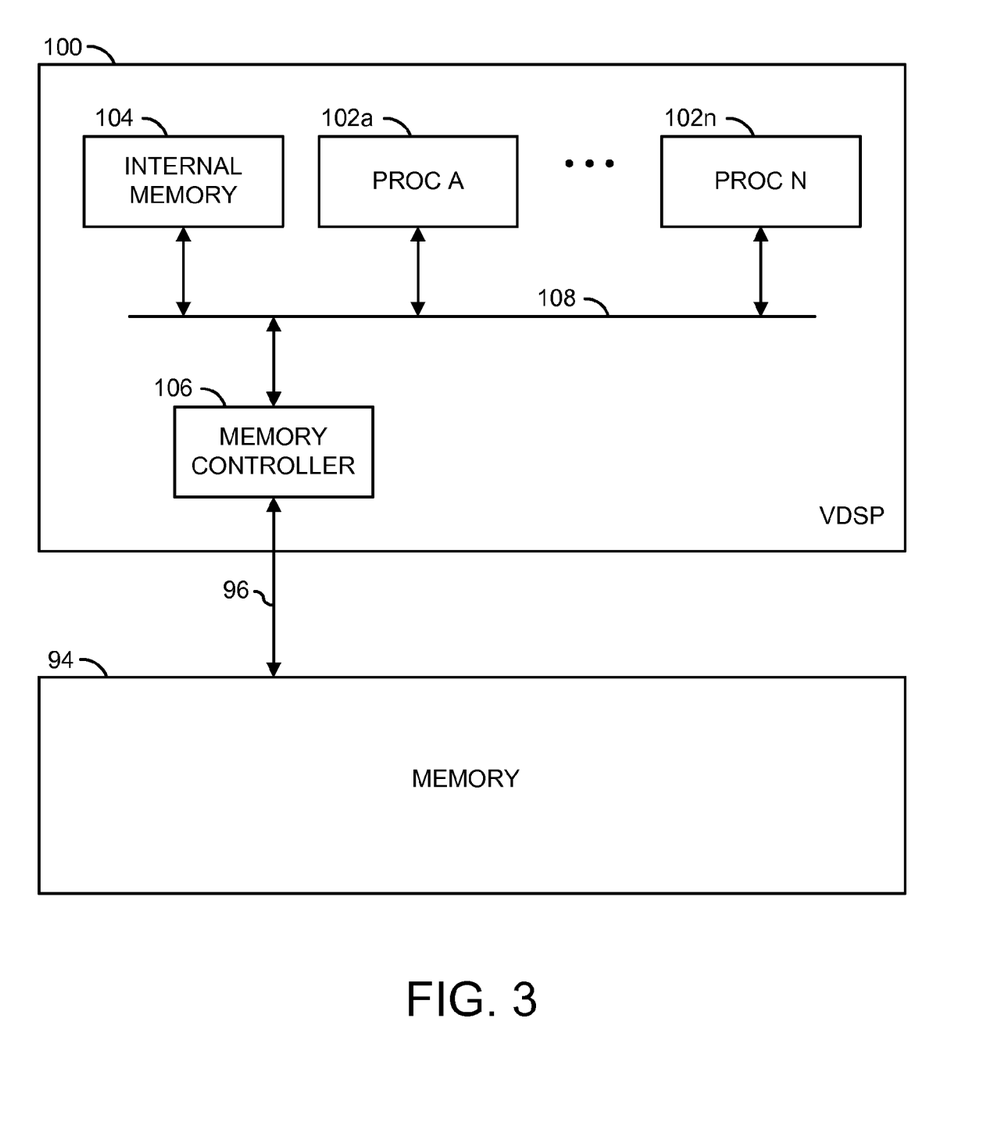
FIG. 3 is a detailed block diagram of the apparatus in accordance with a preferred embodiment of the present invention.

Referring to FIG. 3, a detailed block diagram of the apparatus 90 in accordance with a preferred embodiment of the present invention is shown. The circuit 100 generally comprises multiple blocks (or circuits) 102a-102n, a block (or circuit) 104, a block (or circuit) 106 and a bus (or circuit) 108. The circuits 102a-108 may represent modules and/or blocks that may be implemented as hardware, software, a combination of hardware and software, or other implementations.

The circuit 106 may be bidirectionally coupled to the circuit 94 via the bus 96. The circuits 102a-102n may be bidirectionally coupled to the circuit 106 via the bus 108. The circuit 104 may be bidirectionally coupled to the circuits 106 and 102a-102n via the bus 108.

Each circuit 102a-102n may implement a core processor circuit. The circuits 102a-102n are generally operational to execute a plurality of program instructions (e.g., software programs). The programs may include, but are not limited to, a compression process, an entropy encoding process and a decompression process. The compression process may include, but is not limited to, a control process, a motion estimation process, a motion compensation process, an intra-prediction process, a forward transform process, a quantization process, a complexity computational process and a slice partitioning process. The decompression process may include, but is not limited to, an inverse quantization process, an inverse transform process and a filter process.

The circuit 104 may implement an internal memory circuit. The circuit 104 may be operational to store reference samples and the current block samples used in the motion compensations. The circuit 104 may be utilized by the circuits 102a-102n as a local storage for rapid access to the reference samples and the current block samples.

The circuit 106 may implement a memory controller circuit. The circuit 106 is generally operational to control access of the circuit 94 by the circuits 102a-102n and/or the circuit 92.

The circuit 108 may implement an internal bus. The bus 106 may be operational to transfer data, samples, commands and other information between the circuits 102a-102n, 104 and 106.

Figure 4:
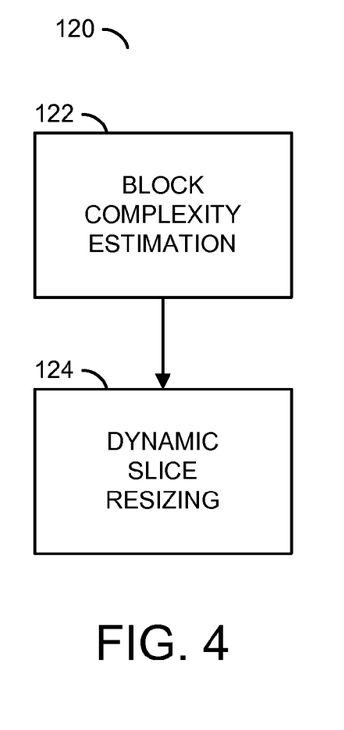
FIG. 4 is a flow diagram of an example implementation of a basic dynamic slice resizing method.

Referring to FIG. 4, a flow diagram of an example implementation of a basic dynamic slice resizing method 120 is shown. The method (or process) 120 may be implemented by the apparatus 90. The method 120 generally comprises a step (or state) 122 and a step (or state) 124. The steps 122-124 may represent modules and/or blocks that may be implemented as hardware, software, a combination of hardware and software or other implementations.

In the step 122, the circuit 100 generally calculates computational complexity statistics (or workloads) from one or more previously coded pictures. The statistics may be a collection of characteristics of the pictures, the encoding techniques actually used in the encoding operations and/or results of the encoding operations. The characteristics generally include the number of macroblock rows in each frame or field. The techniques may include, but are not limited to, encoding the previous pictures using intra macroblocks, inter macroblocks, skipped macroblocks, sub-pixel resolution motion estimations, intra 8×8, 8×16 or 16×8 motion estimations, 4×4 discrete cosine transformations and 8×8 discrete cosine transformation. The results may comprise the number of bits created by the encoder. In the step 124, the circuit 100 may dynamically change the slice sizes for the following picture to balance the encoding workload among the circuits 102a-102n. The number of slices may be based on the number of circuits 102a-102n programmed to perform the compression and entropy encoding.

Figure 5:
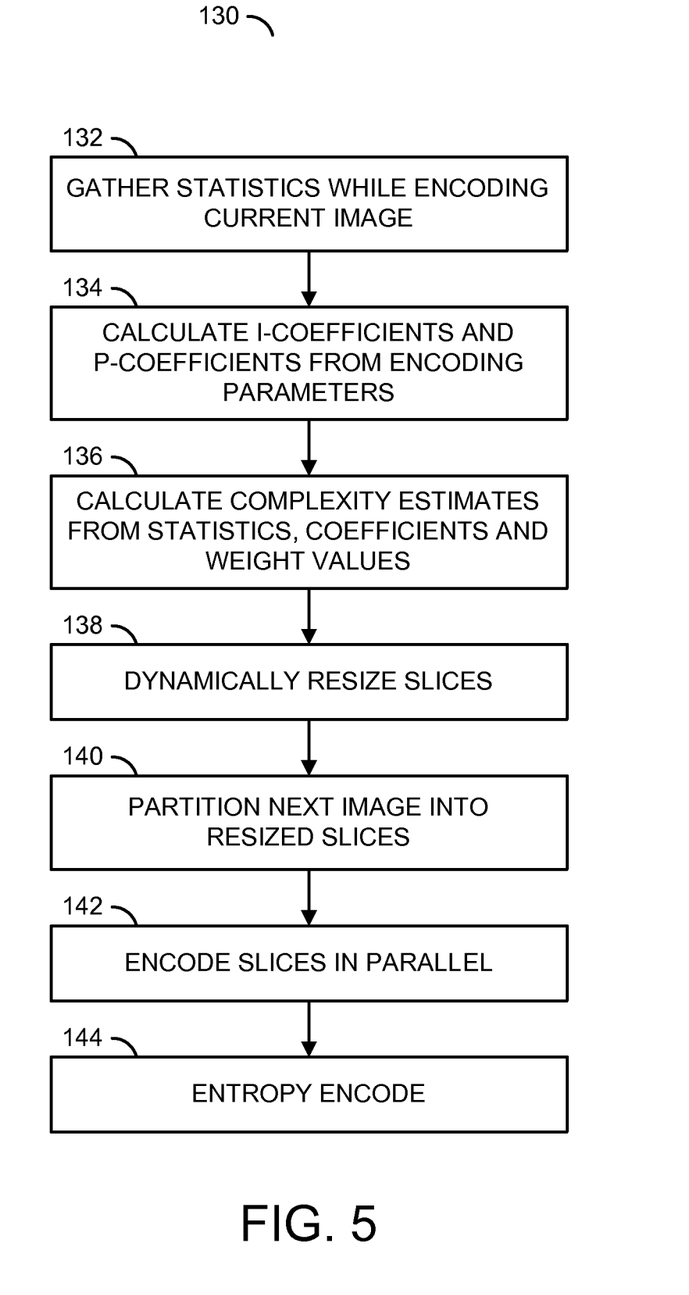
FIG. 5 is a detailed flow diagram of an example implementation of a dynamic slice resizing method.

Referring to FIG. 5, a detailed flow diagram of an example implementation of a dynamic slice resizing method 130 is shown. The method (or process) 130 may be implemented by the apparatus 90. The method 130 generally comprises a step (or state) 132, a step (or state) 134, a step (or state) 136, a step (or state) 138, a step (or state) 140, a step (or state) 142 and a step (or state) 144. The steps 132-144 may represent modules and/or blocks that may be implemented as hardware, software, a combination of hardware and software or other implementations.

In the step 132, the apparatus 90 may encode (compress and entropy encode) a picture received in the signal IN. The resulting encoded information may be presented in the signal OUT. Several (e.g., two) coefficients may be calculated by the apparatus 90 in the step 134 using multiple coder configuration parameters. The coefficients generally correspond to the intra-prediction mode and the inter-prediction mode. An intra-prediction coefficient (e.g., ICoeff) may be calculated for an intra-prediction mode per formula 1 as follows:

$$ICoeff=(settings\_use\_inter\_4\times4)\times(settings\_use\_inter\_16\times16)*200+(settings\_DeblockEnable)\times600+(settings\_Transform\_Adaptive)\times400+400. \quad (1)$$

A predictive coding coefficient (e.g., PCoeff) for an inter-prediction mode may be calculated per formula 2 as follows:

$$PCoeff=(settings\_DeblockEnable)\times400+(settings\_Transform\_Adaptive)\times400+600. \quad (2)$$

The coder configuration parameters of formulae 1 and 2 may be:

settings_use_inter_4×4: set to a value of 1 if intra 4×4 blocks are allowed in inter slices; set to 0 otherwise.

settings_use_inter_16×16: set to a value of 1 if intra 16×16 blocks are allowed in inter slices; set to 0 otherwise.

settings_DeblockEnable: set to 1 if deblocking filter is allowed; set to 0 otherwise.

settings_Transform_Adaptive: set to 1 if both 4×4 and 8×8 transforms are allowed; set to 0 otherwise.

The values 200, 400 and 600 of equations 1 and 2 may be example weight values. Other weight values may be used to meet the criteria of a particular application.

The apparatus 90 (e.g., one or more of the circuits 92 and/or 102a-102n) may calculate complexity estimates in the step 136 from the statistics, the coefficients, and the weight values. The complexity estimates are generally made for each macroblock row in each encoded picture. In the step 138, the apparatus 90 may dynamically resize the slices such that each resized slice has approximately a similar computational complexity and/or consumes a similar amount of time to encode. The dynamic resizing may convert the complexity estimates to (i) a picture estimate, (ii) a slice estimate and (iii) sometimes a partial macroblock row estimate. The various estimates may subsequently be used to resize the slices.

In the step 140, the apparatus 90 may partition a next picture in the signal IN into the resized slices. Each slice of the next picture may be allocated to a respective circuit 102a-102n. The circuits 102a-102n may encode the respective slices in parallel per the step 142. The resulting syntax elements and symbols may be entropy encoded by the apparatus 90 in the step 144 to create the signal OUT.

Figure 6:
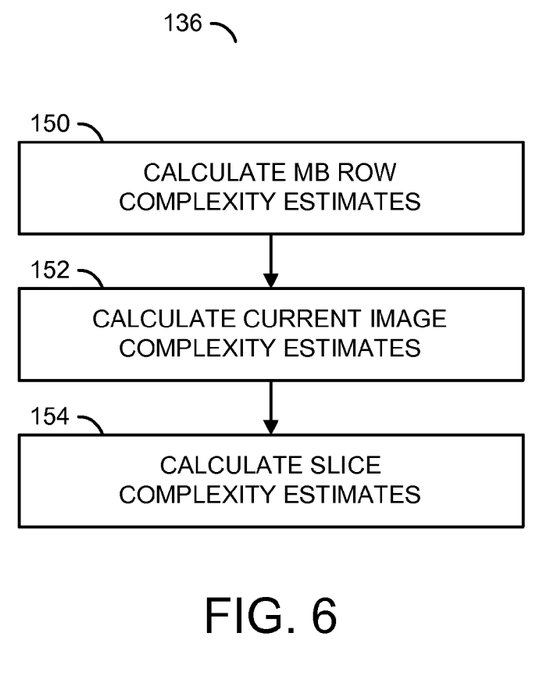
FIG. 6 is a detailed flow diagram of an example implementation of a complexity estimating step.

Referring to FIG. 6, a detailed flow diagram of an example implementation of the step 136 is shown. The step 136 generally comprises a step (or state) 150, a step (or state) 152 and a step (or state) 154. The steps 152-154 may represent modules and/or blocks that may be implemented as hardware, software, a combination of hardware and software or other implementations.

In the step 150, the apparatus 90 may calculate macroblock row complexity estimates (e.g., MB_row_comp_complex_EST). For each macroblock row y=0, ..., max_row_number, the macroblock row computational complexity estimate metrics may be calculated using coder statistic data per formula 3 as follows:

$$MB\_row\_comp\_complex\_EST(y)=(bits\_count)\times4+(intra\_mbs\_count)\times(ICoeff)+(inter\_mbs\_count)\times(PCoeff)+(skip\_mbs\_count)\times600+(MBsubpixelMV\_count)\times225+(I8\times8\_count)\times50+(dct4\times4\_count)\times90+(dct8\times8\_count)\times215, \quad (3)$$

where 4, 600, 225, 50, 90 and 215 are weight values. The coder statistics data in formula 3 may be:

bits_count=number of bits created by the video coder;
intra_mbs_count=number of intra macroblocks encoded;
inter_mbs_count=number of inter macroblocks encoded;
skip_mbs_count=number of SKIP macroblocks encoded;
MBsubpixelMV_count=number of sub-pixel motion estimations;
I8×8_count=number of intra 8×8, 8×16 or 16×8 motion estimations;
dct4×4_count=number of 4×4 transforms calculated;
dct8×8_count=number of 8×8 transforms calculated; and
max_row_number=number of macroblock rows.

In the step 152, the apparatus 90 may calculate a picture computational complexity estimate (e.g., pict_comp_complex_EST) of a current picture per formula 4 as follows:

$$Pict\_comp\_complex\_EST=MB\_row\_comp\_complex\_EST(0)+MB\_row\_comp\_complex\_EST(1)+\ldots+MB\_row\_comp\_complex\_EST(max\_row\_number). \quad (4)$$

In the step 154, the apparatus 90 may calculate a slice computation complexity estimate (e.g., slice_comp_complex_EST) of per formula 5 as follows:

$$Slice\_comp\_complex\_EST=Pict\_comp\_complex\_EST/(slice\_count), \quad (5)$$

where slice_count is the number of slices in a picture.

Figure 7:
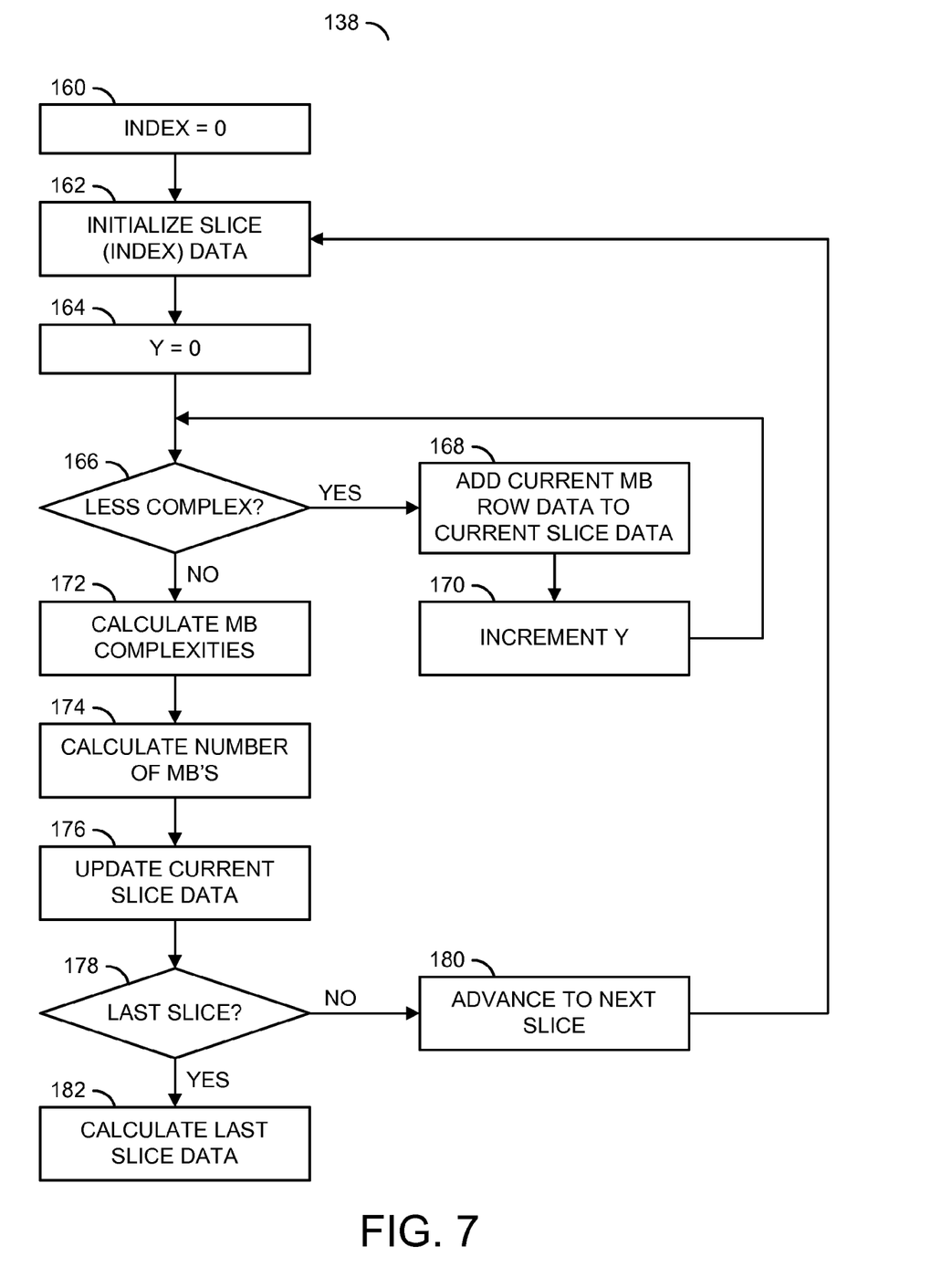
FIG. 7 is a detailed flow diagram of an example implementation of a dynamic resizing step.

Referring to FIG. 7, a detailed flow diagram of an example implementation of the step 138 is shown. The step 138 may comprise a step (or state) 160, a step (or state) 162, a step (or state) 164, a step (or state) 166, a step (or state) 168, a step (or state) 170, a step (or state) 172, a step (or state) 174, a step (or state) 176, a step (or state) 178, a step (or state) 180 and a step (or state) 182. The steps 160-182 may represent modules and/or blocks that may be implemented as hardware, software, a combination of hardware and software or other implementations.

The apparatus 90 may set a slice index parameter (e.g., slice_index) to an initial value (e.g., zero) in the step 160. In the step 162, the apparatus 90 may initialize the slice data. In some embodiments, a slice resize value (e.g., slice_size(slice_index)) value may be set to a default value (e.g., zero). A slice current complexity value (e.g., slice_cur_complexity) may also be set to a default value (e.g., zero or none).

In the step 164, a counter (e.g., Y) of a current macroblock row may be initialized (e.g., set to zero). The counter Y may count from the initial value up to a maximum row value (e.g., max_row_number). In the step 166, the slice current complexity plus the current macroblock row complexity may be compared against the slice computation complexity estimate. If the sum of slice_cur_complexity+MB_row_complexity is less complex than slice_comp_complex_EST, the apparatus 90 may perform following calculations in step 168 per formulae 6 and 7 as follows:

$$Slice\_cur\_complexity=slice\_cur\_complexity+MB\_row\_comp\_complex\_EST(y). \quad (6)$$

$$Slice\_size(slice\_index)=slice\_size(slice\_index)+block\_width, \quad (7)$$

where block_width=number of block columns.

In the step 170, the macroblock row counter Y may be advanced to the next macroblock row and return to the step 166.

If the sum of complexities is more complex than the slice_comp_complex_EST, the apparatus 90 may calculate part of a macroblock row which may be included in the current slice. In the step 172, the apparatus 90 generally calculates an average macroblock complexity estimate value (e.g., MB_avg_comp_complex_EST). The average macroblock estimate may be calculated per formula 8 as follows:

$$\text{MB\_avg\_comp\_complex\_EST} = \text{MB\_row\_comp\_complex\_EST}(y)/(\text{block\_width}). \quad (8)$$

In the step 174, a number (e.g., N) of macroblocks that could be added to the current slice without exceeding the slice computational complexity estimate may be calculated. The number N may be calculated per formula 9 as follows:

$$N = (\text{slice\_comp\_complex\_EST} - \text{slice\_cur\_complexity}) / \text{MB\_avg\_comp\_complex\_EST}. \quad (9)$$

In the step 176, the current slice data may be updated by the apparatus 90 per formula 10 as follows:

$$\text{Slice\_size}(\text{slice\_index}) = \text{Slice\_size}(\text{slice\_index}) + N. \quad (10)$$

A check may be performed in the step 178 to determine if the second-to-last slice has been resized. If not, the apparatus 90 may advance to the next slice per the step 180. The advancing may include updating data per formulae 11-13 as follows:

$$\text{Slice\_index} = \text{slice\_index} + 1. \quad (11)$$

$$\text{Slice\_size}(\text{slice\_index}) = \text{block\_width} - N. \quad (12)$$

$$\text{Slice\_cur\_complexity} = (\text{block\_width} - N) \times \text{MB\_avg\_comp\_complex\_EST}. \quad (13)$$

The method 138 may return to the step 162 to initialize the new current slice.

Once the second-to-last slice has been resized, the apparatus 90 may resize the last slice in the step 182. A different formula may be used for the last slice to avoid any rounding problems. The resize value of the last slice may be calculated by formula 14 as follows:

$$\text{Slice\_size}(\text{slice\_count}-1) = \text{frame\_size\_block} - \text{slice\_size}(0) - \text{slice\_size}(1) - \ldots \text{slice\_size}(\text{slice\_count}-2). \quad (14)$$

After all of the slices have been resized, the apparatus 90 may continue with regular slice processing.

In some embodiments, the resizing of the slices for the next picture may be based on the statistics of the current picture and one or more previous pictures. For example, the statistics from the current picture and the previous picture may be averaged together to replace the current picture statistics. In another example, the statistics from several (e.g., 4 or 8) pictures may be combined in a running average that is applied to the resizing operations.

Figure 8:
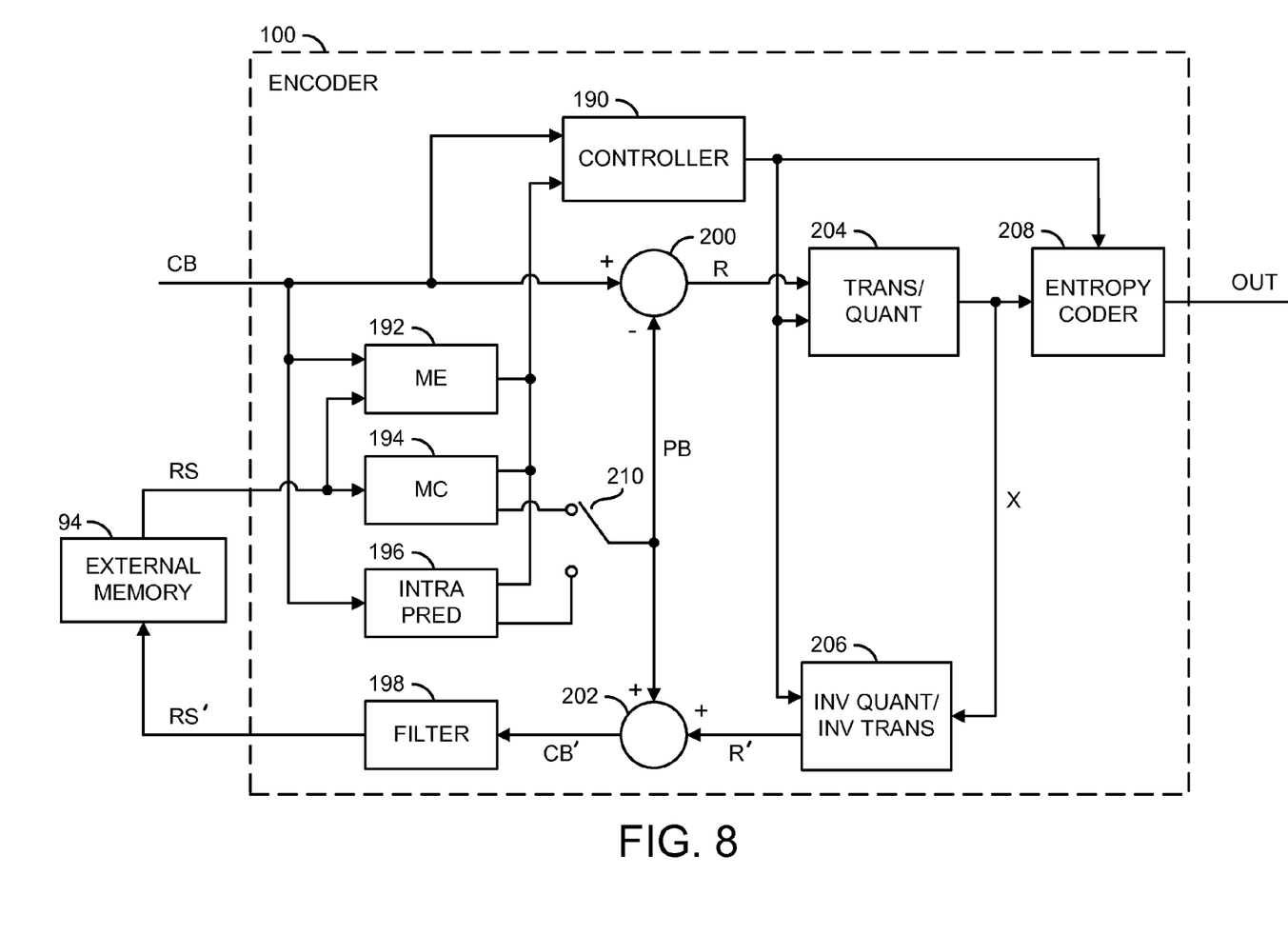
FIG. 8 is a functional block diagram of an encoder circuit.

Referring to FIG. 8, a functional block diagram of the circuit 100 is shown. The encoder circuit 100 generally comprises a controller step (or function) 190, a motion estimation (e.g., ME) step (or function) 192, a motion compensation (e.g., MC) step (or function) 194, an intra-prediction step (or function) 196, a filter step (or function) 198, an adder step (or function) 200, another adder step (or function) 202, a transform/quantization step (or function) 204, an inverse quantize/inverse transform step (or function) 206, an entropy coder step (or function) 208 and a switch step (or function) 210. The encoder 100 may implement a hybrid video codec. The steps 190-210 may be implemented as hardware, software or a combination of hardware and software.

A signal (e.g., CB) may be received by the controller step 190, the ME step 192, the intra-prediction step 196 and the adder step 200. The signal CB may carry a current block from the signal IN that is being encoded. The signal OUT may be generated by the entropy coder step 208. The MC step 194 and the ME step 192 may receive reference picture data from the memory circuit 94 in a signal (e.g., RS). The filter step 198 may generate and transfer new reference pictures to the memory circuit 94 in a signal (e.g., RS'). A residual signal (e.g., R) may be generated by the adder step 200 and transferred to the transform/quantization step 204. The signal R may convey residual information produced by subtracting picture blocks from prediction blocks. The transform/quantization step 204 may generate and transfer a signal (e.g., X) to the entropy coder step 208 and the inverse quantization/inverse transform step 206. The signal X may carry the transformed and quantized data representative of the residual blocks. A residual signal (e.g., R') may be generated by the inverse quantize/inverse transform step 206 and presented to the adder step 202. The signal R' may carry reconstructed residual information. A prediction signal (e.g., PB) may be generated by the MC step 194 or the intra-prediction step 196, depending on the encoding mode. The signal PB generally carries the prediction blocks used by the adder steps 200 and 202. The signal PB may be routed from one of the steps 194 or 196 to the adder steps 200 and 202 by the switch step 210. A reconstructed signal (e.g., CB') may be generated by the step 202 and transferred to the step 198. The signal CB' may convey reconstructed blocks, similar to the blocks received in the signal CB. A reference signal (e.g., RS') may be generated by the step 198 and transferred to the circuit 94. The signal RS' may carry reconstructed reference blocks used to create the reference pictures.

The control step 190 may implement an encoding control function. The step 190 is generally operational to control encoding of the video signal. The video signal generally comprises multiple interlaced fields and/or multiple progressive frames.

The ME step 192 may implement a motion estimation function. The step 192 is generally operational to estimate a motion between a current block of a current picture (or field or frame) and a closest matching block in a reference picture (or field or frame). The estimated motion may be expressed as a motion vector that points from the current block to the closest matching reference block. The reference picture may be earlier or later in time than the current picture. The reference picture may be spaced one or more temporal inter-picture distances from the current picture. Each pixel of a picture may be considered to have a luminance (sometimes called "luma" for short) value (or sample) and two chrominance (sometimes called "chromes" for short) values (or samples). The motion estimation is generally performed using the luminance samples.

The MC step 194 may implement a motion compensation function. The step 194 is generally operational to calculate a motion compensated (or predicted) block based on the reference samples received in the signal RS and a motion vector received from the step 192. Calculation of the motion compensated block generally involves grouping a block of reference samples around the motion vector where the motion vector has integer-pel (or pixel or sample) dimensions. Where the motion vector has sub-pel dimensions, the motion compensation generally involves calculating interpolated reference samples at sub-pel locations between the integer-pel locations. The sub-pel locations may include, but are not limited to, half-pel locations, quarter-pel locations and eighth-pel locations. The motion compensated block may be presented in the signal PB.

The intra-prediction step 196 may implement an inter-prediction function. The step 196 is generally operational to calculate intra-predicted blocks from other blocks internal to the current picture. The intra-predicted blocks may be presented in the signal PB.

The filter step 198 may implement a spatial filter function. The step 198 is generally operational to spatially filter the reconstructed blocks received in the signal CB'. The filter blocks may be presented as new reference blocks to the circuit 94 in the signal RS'.

The adder step 200 may implement an addition function. The step 200 is generally operational to create residual blocks by adding an inverse of (or subtracting) the motion compensated blocks from the current blocks. The differences may be calculated on a sample-by-sample basis where each sample in a motion compensated block is subtracted from a respective current sample in a current block to calculate a respective residual sample (or element) in a residual block. The residual blocks may be presented in the signal R.

The adder step 202 may implement an adder function. The step 202 may be operational to add the reconstructed residual samples received via the signal R' to the predicted samples received via the signal PB to generate reconstructed current samples. The reconstructed current samples may be presented in the signal CB' to the filter step 198.

The transform step 204 may implement transformation and quantization functions. The step 204 is generally operational to transform the residual samples in the residual blocks into transform coefficients. The step 204 may also be operational to quantize the transform coefficients. The resulting coefficients may be presented in the signal X to the step 208 and the step 206.

The inverse quantization/inverse transform step 206 may implement inverse quantization and inverse transformation functions. The step 206 is generally operational to inverse quantize the coefficients received in the signal X to calculate reconstructed transform coefficients. The step 206 may also be operational to inverse transform the reconstructed transform coefficients to calculate reconstructed residual samples. The step 206 may reverse the quantization and transformation functions performed by the step 204. The reconstructed residual samples may be transferred to the step 202 in the signal R'.

The entropy coder step 208 may implement an entropy encoder function. The step 208 is generally operational to entropy encode a string of reordered symbols and syntax elements that represent the resulting quantized transform coefficients, motion vectors, encoding modes and other data. The encoded information may be presented in the signal OUT.

The switch step 210 may implement a switching function. The step 210 may be operational to route the predicted blocks from the step 196 while the step 190 has selected intra-prediction. The step 210 may also be operational to route the motion compensated prediction blocks from the step 194 while the step 190 has selected inter-prediction.

Figure 9:
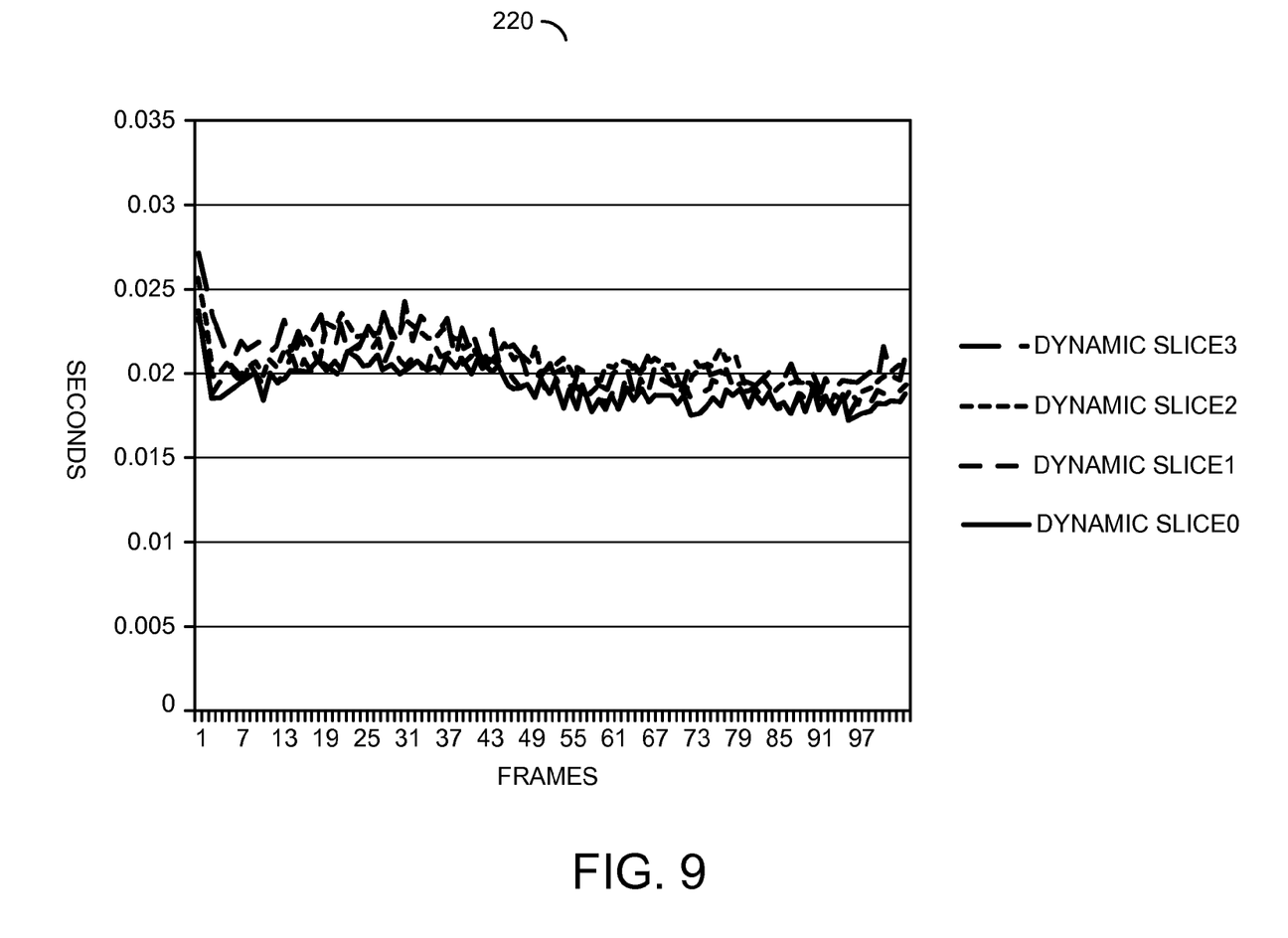
FIG. 9 is a graph of slice encoding time using dynamic slice sizes.

Referring to FIG. 9, a graph 220 of slice encoding time using dynamic slice sizes is shown. The graph 220 generally illustrates four dynamically-sized slices from the 1280×710 sequence of 100 frames using quantization parameters of 32 for intra-predicted frames and 30 for inter-predicted frames. As illustrated, the time used to encode each slice (e.g., SLICE0-SLICE3) is similar so all of the cores 102*a*-102*n* finish in approximately the same amount of time.

Some embodiments of the present invention may provide a novel technique for estimating the computational complexity of the blocks of pixels, the block rows and whole video pictures. A technique to dynamic resize slices of pictures may also be implemented. As a result, an approximately 20 percent coding speed improvement may be achieved for a parallel video encoder without loss in subjective or objective performances.

The functions performed by the diagrams of FIGS. 2-8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. An apparatus comprising: a plurality of processors configured to (i) gather a plurality of statistics by encoding a current picture in a video signal, (ii) calculate a plurality of complexity values in response to both said statistics and a plurality of coefficients and (iii) partition a next picture in said video signal into a plurality of slices in response to said complexity values such that each of said slices has a similar coding complexity, wherein (a) said statistics characterize how said current picture was encoded and (b) said coefficients correspond to a plurality of coding modes, wherein:
said complexity values correspond to a plurality of respective macroblock rows in said current picture; and
said statistics per each of said macroblock rows comprise (i) a number of bits created by said encoding, (ii) a number of inter-coded macroblocks, (iii) a number of intra-coded macroblocks, (iv) a number of skip-coded macroblocks, (v) a number of sub-pixel motion estimations, (vi) a number of intra-block motion estimations and (vii) a number of transformations from a spatial domain to a frequency domain.

2. The apparatus according to claim 1, wherein (i) said processors are further configured to encode said next picture operating and (ii) each one of said slices is encoded by a respective one of said processors operating in parallel.

3. The apparatus according to claim 1, wherein said processors are further configured to calculate a first of said coefficients in response to a plurality of first parameters that control an inter-prediction mode of said coding modes.

4. The apparatus according to claim 3, wherein said processors are further configured to calculate a second of said coefficients in response to a plurality of second parameters that control an intra-prediction mode of said coding modes.

5. The apparatus according to claim 1, wherein said complexity values are calculated in further response to one or more weight values.

6. The apparatus according to claim 1, wherein said processors are further configured to (i) divide one of said macroblock rows into two sub-sections and (ii) divide one of said complexity values into two of said complexity values that correspond to said two sub-sections.

7. The apparatus according to claim 1, wherein said encode comprises an H.264 encode.

8. The apparatus according to claim 1, wherein said apparatus is implemented as one or more integrated circuits.

9. A method for dynamic slice resizing while encoding video, comprising the steps of: (A) gathering a plurality of statistics by encoding a current picture in a video signal, wherein said statistics characterize how said current picture was encoded by a plurality of processors; (B) calculating a plurality of complexity values in response to both said statistics and a plurality of coefficients, wherein said coefficients correspond to a plurality of coding modes; and (C) partitioning a next picture in said video signal into a plurality of slices in response to said complexity values such that each of said slices has a similar coding complexity, wherein:
said complexity values correspond to a plurality of respective macroblock rows in said current picture; and
said statistics per each of said macroblock rows comprise (i) a number of bits created by said encoding, (ii) a number of inter-coded macroblocks, (iii) a number of intra-coded macroblocks, (iv) a number of skip-coded macroblocks, (v) a number of sub-pixel motion estimations, (vi) a number of intra-block motion estimations and (vii) a number of transformations from a spatial domain to a frequency domain.

10. The method according to claim 9, further comprising the step of: encoding said next picture using said processors, wherein each one of said slices is encoded by a respective one of said processors operating in parallel.

11. The method according to claim 9, further comprising the step of: calculating a first of said coefficients in response to a plurality of first parameters that control an inter-prediction mode of said coding modes.

12. The method according to claim 11, further comprising the step of: calculating a second of said coefficients in response to a plurality of second parameters that control an intra-prediction mode of said coding modes.

13. The method according to claim 9, wherein said complexity values are calculated in further response to one or more weight values.

14. The method according to claim 9, further comprising the steps of: dividing one of said macroblock rows into two sub-sections; and dividing one of said complexity values into two of said complexity values that correspond to said two sub-sections.

15. The method according to claim 9, wherein said encoding comprises an H.264 encoding.

16. An apparatus comprising:
means for gathering a plurality of statistics by encoding a current picture in a video signal, wherein said statistics characterize how said current picture was encoded;
means for calculating a plurality of complexity values in response to both said statistics and a plurality of coefficients, wherein said coefficients correspond to a plurality of coding modes; and
means for partitioning a next picture in said video signal into a plurality of slices in response to said complexity values such that each of said slices has a similar coding complexity, wherein:
said complexity values correspond to a plurality of respective macroblock rows in said current picture; and
said statistics per each of said macroblock rows comprise (i) a number of bits created by said encoding, (ii) a number of inter-coded macroblocks, (iii) a number of intra-coded macroblocks, (iv) a number of skip-coded macroblocks, (v) a number of sub-pixel motion estimations, (vi) a number of intra-block motion estimations and (vii) a number of transformations from a spatial domain to a frequency domain.

* * * * *